United States Patent [19]

Collier

[11] Patent Number: 4,684,675
[45] Date of Patent: Aug. 4, 1987

[54] MATTING LACQUER, PAINT AND LIGHT-TRANSMITTING MATTE FILM

[76] Inventor: Charles P. Collier, 1488 Crestline Dr., Santa Barbara, Calif. 93105

[21] Appl. No.: 890,500

[22] Filed: Jul. 30, 1986

[51] Int. Cl.$^4$ .......................... C08K 7/00; C08K 7/16
[52] U.S. Cl. .................................. 523/220; 523/223; 524/42; 524/523
[58] Field of Search .................. 523/220, 223; 524/42, 524/523

[56] References Cited

U.S. PATENT DOCUMENTS

| | | |
|---|---|---|
| 2,191,939 | 2/1940 | Marx, Jr. |
| 3,152,899 | 10/1964 | Marx, Jr. .............................. 430/396 |
| 3,527,729 | 9/1970 | Bingham et al. ..................... 523/223 |
| 3,592,725 | 7/1971 | Yoshimura et al. ................. 523/220 |
| 4,301,046 | 11/1981 | Schlossman .......................... 524/42 |
| 4,424,091 | 1/1984 | Mizuno et al. .......................... 8/470 |
| 4,429,065 | 1/1984 | Gancy ................................... 523/223 |
| 4,474,909 | 10/1984 | Smith et al. .......................... 523/223 |
| 4,526,910 | 7/1985 | Das et al. ............................. 523/220 |
| 4,598,112 | 7/1986 | Howard ................................ 523/223 |

FOREIGN PATENT DOCUMENTS

| | | | |
|---|---|---|---|
| 56-118444 | 9/1981 | Japan .................................. 523/220 |
| 59-155434 | 9/1984 | Japan .................................. 523/220 |
| 1440269 | 6/1976 | United Kingdom ................ 523/223 |

Primary Examiner—Joseph L. Schofer
Assistant Examiner—N. Sarofim
Attorney, Agent, or Firm—John J. Posta, Jr.

[57] ABSTRACT

The sprayable matting lacquer is preferably applied to a transparent or translucent polymeric base film to provide the composite film with desired non-streaking matte properties so that such film becomes suitable for use by artists and the like. The matting lacquer includes a plastic resin film-forming agent, a soft matting agent formed of discrete uniformly spherical, smooth-surfaced polyolefin, preferably polyethylene particles having an average diameter not in excess of about 40 microns and preferably 10–40 microns and in a ratio of 1–3:3–1 to the resin, a relatively hard matting agent composed of particles of silica, calcium carbonate or the like, in a concentration of about 10% that of the soft matting agent, an organic solvent for the film-former and a plasticizer. The aqueous paint which is utilizable on the matted film includes the described soft matting agent, a resinous film-forming binder and dispersing agent, as well as a transparent coloring agent. This composition without the coloring agent can be used as a diluent for the paint.

9 Claims, 1 Drawing Figure

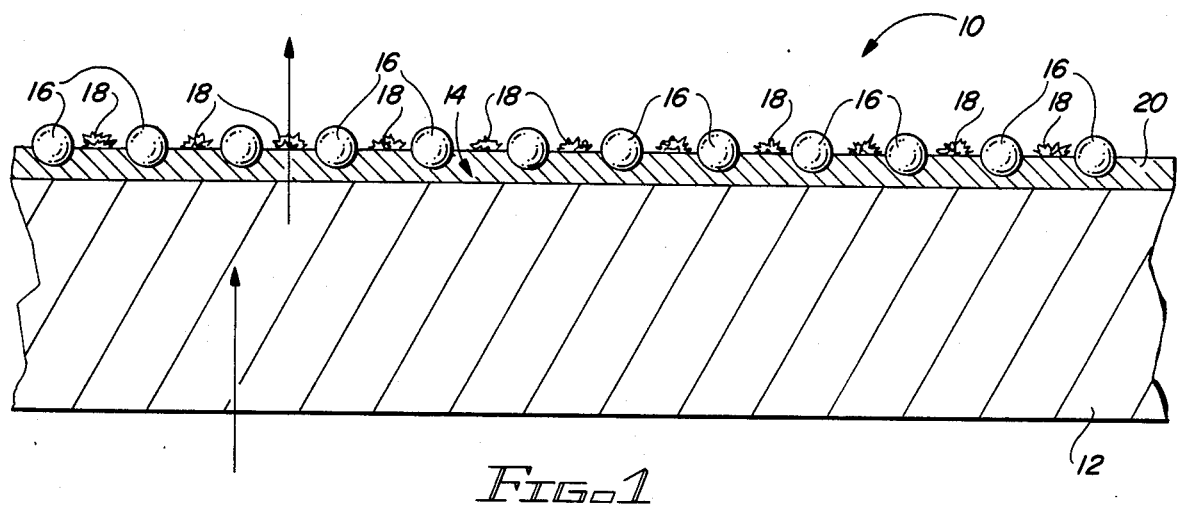

MATTING LACQUER, PAINT AND LIGHT-TRANSMITTING MATTE FILM

BACKGROUND OF THE INVENTION

1. Field of the Invention

The present invention generally relates to lacquers and paints and films treated with lacquers and, more particularly, to improved matting lacquers, transparent and translucent films treated thereto and paints applicable thereover.

2. Prior Art

Difficulties have been encountered in the past in providing artists with a suitable transparent or translucent matte surface film upon which the artist can brush-apply, to a set boundary, a broad area of a transparent or translucent color that will lay and dry in a uniform tone without deeper or lighter areas of color, or streaks. In addition, after the first application dries, the artist should be able to then apply another color or tone over it without disturbing it, and the second coat should also dry uniformly and streak-free. Such paintings of flat tones are desirable, for example, when coloring comics and advertisements for subsequent printed reproduction for newspapers. The original comic or advertising art is quite often a black line image, which is preferable to keep free of any colors in order to preserve the original, as well as to maintain separation of the black image from the colored one(s) throughout the color separation and printing steps.

One of the present art techniques for coloring comics with color paints is to overlay the black line comic drawing with film, tissue, translucent paper or thin art board, and apply color to the overlay. The problems associated with this method are numerous, and include the inability to obtain uniform streak-free colors, the inability to adequately see through the overlay (even when working over a light table), the inability to hold the color to the boundary line (especially on film), the buckling of thin paper or tissue with watercolor paints and, if over-painting one color on another, the dissolving or bleeding of the first color by the second.

Accordingly, there remains a need for suitable matte surface films upon which uniform, streak-free transparent or translucent color can be applied, and for lacquers, paints and the like utilizable with such films.

Such lacquers, paints and films should be simple and inexpensive to prepare and use and should exhibit superior properties.

SUMMARY OF THE INVENTION

The improved matte film, lacquer and paint of the present invention satisfies all the foregoing needs. The film, lacquer and paint are substantially as set forth in the Abstract. Thus, the desired unique matte surface is provided by a matting lacquer that can be sprayed by compressed air, or aerosol propellant container, or brush-applied onto any receptive surface. It also can be machine-applied to a base or film, thereby creating the matte surface film of the present invention for artists' overlays, as described above. This matte surface film includes a transparent or translucent base film of polystyrene, polyester, polyvinylchloride, or the like of any desired thickness, preferably in the 2- to 8-mil range. The matting lacquer is spray-coated or machine-coated by gravure, Mayer rod, silk screen, or other conventional coating methods, onto the base film.

The coating lacquer, for both machine application onto base film and bulk form for hand application includes film-forming synthetic, or natural resin(s), dissolved in suitable solvents, a plasticizer to maintain flexibility of the dried lacquer, and a matting agent of specific concentration and particle size and shape. It is the soft matting agent that imparts the unique surface quality to the film. Each particle of the soft matting agent is substantially spherical in shape, smooth, not irregular, in surface texture, and relatively uniform in size.

These requirements for size, shape and texture of the matting agent are met by materials such as are sold under U. S. registered trademarks Microthene and Microthene F for microfine polyolefin powders, manufactured by U. S. Industrial Chemicals Company, a division of National Distillers and Chemical Corporation. Usually, such particles are of polyethylene. Such materials have average particle diameters of usually about 20 microns or less, for example, about 10–20 microns. However, particles up to 40 microns in diameter are also suitable.

The ratio, by weight, of the film-forming resin to the matting agent is approximately one to one. Ratios as low as 1 part resin to 3 parts of the soft matting agent, by weight, and as high as 3 parts resin to 1 part of the soft matting agent, by weight, are acceptable. The concentration of the resin should be such as to hold the soft matting agent's spherical particles securely in the dried lacquer coat, and yet the coat should not be so thick as to cover those particles. Surface painting efficiency begins to decrease as resin coating thickness approaches one-half to two-thirds the approximate diameter of the spheres.

Since the spherical polyethylene (polyolefin) particles are soft and can easily be deformed by pressure (e.g. fingernail marks), it is necessary to incorporate in the lacquer a hard matting agent, such as calcium carbonate or silicon dioxide, of approximately the same or somewhat larger particle size as the soft matting agent spherical particles to appreciably harden the surface of the dried coating and increase its resistance to indentations. The ratio, by weight, is in the range of 1 part hard matting agent to 10 parts of soft matting agent spherical particles.

The transparent paints of this invention are water-based and contain a synthetic resin preferably emulsion polymer as a film-forming binder, colored transparent pigments, the previous described spherical-shaped polyolefin particles and surface active agent(s) to disperse and suspend the pigment(s) and spherical particles. The pigment is needed for coloring, and the spherical particles are needed to facilitate the application of a uniform, streak-free second coat of the paint over a previously applied first coat of the paint.

When the pigment is omitted from the above paint, the remaining composition can be used as a diluent, or thinner, to lighten any of the described pigmented paints.

Further, if the transparent paints and the diluent or thinner for the paints contain an absorbent of ultraviolet light, and the matte lacquer coating has been applied to a colorless and transparent or translucent film that transmits ultraviolet light, the coloring system can then be used as a method of color reproduction, as described in U.S. Pat. No. 3,152,899, Oct. 13, 1964.

Further features of the present invention are set forth in the following detailed description and accompanying drawings.

DRAWINGS

The single Figure, FIG. 1, schematically depicts in enlarged fragmentary vertical cross-section, a preferred embodiment of the matte film of the present invention.

DETAILED DESCRIPTION

FIG. 1

Now referring more particularly to the accompanying drawing, a preferred embodiment of the improved matte film of the present invention is schematically depicted therein. Thus, film 10 is shown which comprises a base film 12 of light-transmitting material which is either translucent or transparent. Such base film 12 is preferably polystyrene, polyester or polyvinyl chloride and is preferably about 2-8 mils in thickness. It will be understood that, if desired, film 12 could be of other non-matting materials, such as glass, other plastic or even of opaque metal, ceramic, paper, etc.

A top film 14 strongly adheres thereto and is formed from the lacquer of the present invention. Film 14 is not in excess of about one-half the thickness of film 12 and usually is very much thinner. Thus, film 14 comprises a spaced plurality of uniformly spherical particles 16 of relatively soft matting agent interspersed with somewhat irregular particles 18 of approximately the same size as particles 16 or slightly smaller but of hard matting agent.

Particles 18 are of silicon dioxide or calcium carbonate or the like hard material and are present in a concentration, by weight, about 10% that of particles 16. Particles 16 are of about 10-40 microns in average diameter, in most cases about 10-20 microns and are formed of polyolefin, preferably polyethylene. They are readily fingernail depressible, but when deployed in film 14 are protected by hard particles 18 so that film 14 is resistant to fingernail pressure deformation. As previously described, the uniform soft matting agent particles 16 impart the necessary matting texture to film 14 and composite film 10.

Film 14 includes a dried or set plasticized matrix 20 of plastic resin material of sufficient flexibility and strength to strongly adhere to base film 12 and bend therewith. The resin material forming matrix 20 preferably comprises at least one of set styrene maleate resin, acrylic ester resin and ethyl cellulose. A plasticizer such as sucrose acetate isobutyrate, dibutyl phthalate and/or tricresyl phosphate is present in a concentration in the matrix sufficient to provide matrix 20 with the desired flexibility and strength. Matrix 20 is present in film 14 in a concentration sufficient to anchor the soft matting agent particles 16 firmly in place, along with particles 18, but insufficient to totally cover particles 16. Usually, the thickness of matrix 20 is not in excess of about 50-60% of the diameter of particles 16. The weight rates of resin forming the matrix 20 to particles 16 is about 3-1:1-3, with the weight ratio being preferably about 1:1.

The lacquer of the present invention from which film 14 is formed contains, in addition to the above-described ingredients for film 14, one or more organic solvents in a sufficient concentration to dissolve or fluidize the resin component and to form a slurry with the soft and hard particles. The specific solvents will vary, depending on the specific resin(s) used. Normally, at least one of isopropanol, propylene glycol monomethyl ether, methyl ethyl ketone, toluene and ethyl alcohol is used as the solvent. Below are present non-limiting specific examples of typical formulations of the matting lacquer, film and paint of the present invention:

EXAMPLE I

TABLE I

| INGREDIENT | CONCENTRATION |
| --- | --- |
| Styrene maleate resin (film former) | 10 g. |
| Polyethylene soft matting agent (particle diameter about 30 microns) | 10 g. |
| Powdered silicon dioxide (hard matting agent about 50 microns diameter) | 1 g. |
| Isopropanol (solvent) | 50 ml. |
| Propylene glycol monomethyl ether (solvent) | 50 ml. |
| Sucrose acetate isobutyrate (plasticizer) | 1 g. |

A lacquer is made by blending all the ingredients of Table I together until a uniformly fluid slurry is obtained. This resulting lacquer is then sprayed on a 3 mil thick transparent polystyrene film to a matrix thickness, when dried, of about 10 microns, and is air dried until set into a solid film with the polyethylene and silicon dioxide particles partially exposed on the surface thereof to provide the base film with an adherent flexible matte surface sufficiently hard to resist denting and highly suitable for use as an artists' substrate for the application of the transparent colored paint, such as than set forth below, without streaking, without deeper or lighter areas of color, and with the capability of having subsequent paint layers applied thereover without streaking.

The colored paint of the invention applied to the finished matte film of the invention has the typical formulation set forth in Table II below:

TABLE II

| INGREDIENT | CONCENTRATION |
| --- | --- |
| water (diluent) | 75 ml. |
| Tetra sodium pyrophosphate (dispersing agent) | 0.2 g. |
| alkyl-aryl polyether alcohol (dispersing agent) | 0.25 ml. |
| polyethylene soft matting agent (particle diameter about 20 microns) | 1.0 g. |
| acrylic emulsion polymer resin (film former) | 25 ml. |
| Victoria Blue: C.I. (color index) pigment Blue 62 | minor concentration |

The paint is made by mixing all the ingredients of Table II together until uniformly blended. When it is desired to thin the paint, a diluent comprising the same paint minus the coloring agent is used.

EXAMPLE II

A second lacquer of the present invention is made up using the formula set forth in Table III below:

TABLE III

| INGREDIENT | CONCENTRATION |
| --- | --- |
| acrylic ester resin (film former) | 8 g. |
| polyethylene soft matting agent (average particle diameter 10 microns) | 12 g. |
| calcium carbonate (hard matting agent) (average particle diameter about 40 microns) | 1.2 g. |
| methyl ethyl ketone | 40 ml. |
| cellosolve acetate | 10 ml. |
| ethyl alcohol | 50 ml. |

TABLE III-continued

| INGREDIENT | CONCENTRATION |
| --- | --- |
| dibutyl phthalate | 1 g. |

The lacquer of Table III has substantially the same matting properties as that of Table I and those lacquers of the formulas A, B and C set out in Table IV below:

TABLE IV

| FORMULA | INGREDIENT | CONCENTRATION |
| --- | --- | --- |
| A | ethyl cellulose | 15 g. |
| A | polyethylene soft matting agent (particles 20 microns in diameter) | 10 g. |
| A | silica particles (particles 40 microns in diameter) | 1 g. |
| A | Toluene | 60 ml. |
| A | Isopropanol | 30 ml. |
| A | Cellosolve acetate | 10 ml. |
| A | Tricresyl phosphate (plasticizer) | 1 g. |
| B | styrene maleate resin | 20 g. |
| B | polyethylene soft matting agent (particles 20 microns in diameter | 8 g. |
| B | calcium carbonate (particles 20 microns in diameter) | .8 g. |
| B | isopropanol | 150 ml. |
| B | dibutyl phthalate | 1 g. |
| C | acrylic ester resin | 5 g. |
| C | polyethylene soft matting agent (particles 40 microns in diameter) | 15 g. |
| C | silica particles (particles 40 microns in diameter) | 1.5 g. |
| C | methyl ethyl ketone | 20 ml. |
| C | sucrose acetate isobutyrate | 1 g. |
| C | cellosolve acetate | 20 ml. |

In Table V below are set forth alternative formulas X, Y & Z for the transparent paint of the present invention utilizable in the matted film of the invention:

TABLE V

| FORMULA | INGREDIENT | CONCENTRATION |
| --- | --- | --- |
| X | water | 80 ml. |
| X | non-ionic polyoxyalkylene derivative of propylene glycol (dispersing agent) | 0.3 ml. |
| X | polyethylene soft matting agent (particles 20 microns in diameter) | 1.5 g. |
| X | Vinyl-acrylic copolymer latex resin | 30 ml. |
| X | Methyl Violet: C.I. Pigment Violet 27 | to desired concentration |
| Y | water | 70 ml. |
| Y | diethylene glycol (emulsifier) | 0.5 ml. |
| Y | polyethylene soft matting agent (particles 20 microns in diameter) | 2 g. |
| Y | acrylic emulsion polymer | 30 ml. |
| Y | Barium red: C.I. Pigment red 48:1 | to desired concentration |
| Z | water | 60 ml. |
| Z | Tetra sodium pyrophosphate | 0.2 g. |
| Z | non-ionic polyoxyalkylene derivative of propylene glycol (dispersing agent) | 0.25 ml |
| Z | polyethylene soft matting agent (particle diameter of 20 microns) | 1 g. |
| Z | acrylic ester resin | 24 ml. |
| Z | DNA orange: C.I. Pigment Orange 5 | to desired concentration |
| Z | ultraviolet light absorber (stilbene derivative) 4,4'-diamino-2,2' disulfostilbene | 3 g. |
| Z | Phorwite REU C.I. FWA119 | 3 g. |

The transparent paint of formula Z is suitable for use with the matte film of the present invention for a number of purposes, including use in the method of color reproduction such as is described in U.S. Pat. No. 3,152,899, due to the presence therein of an ultraviolet light absorber.

It will be understood that any such ultraviolet light absorber can be used in an effective concentration as can any suitable dispersing or emulsifying agent and resin binder, with the selected transparent coloring agent and described soft matting agent. The relative proportions of ingredients for the paint and lacquer will vary. As previously described, the weight ratio of resin to polyethylene particles is about 1-3:3-1 in the lacquer formulations, with the solvents used therein and plasticizers in appropriate concentrations relative to the resin and soft and hard particle concentrations. The paint formulas similarly somewhat varied in the proportions of ingredients. All contain the dispersing or emulsifying agent, water, resin, film former, soft matting particles and coloring agent, as described above.

Various other modifications, changes, alterations and additions can be made in the improved matte film, lacquer, paint and diluent of the invention, their components, and parameters. All such modifications, changes, alterations as are within the scope of the appended claims, form part of the present invention.

What is claimed is:

1. An improved sprayable matting lacquer providing, when set on a substrate, a paint-receptive surface, said lacquer comprising:
   (a) a film-forming plastic resin agent;
   (b) a relatively soft matting agent comprising a plurality of discrete substantially uniformly spherical, smooth-surfaced fingernail-depressible non-elastomeric polyethylene particles;
   (c) a relatively hard matting agent comprising a plurality of discrete particles of an average diameter approximately comparable to that of said polyethylene particles and particles sufficiently hard to prevent fingernail indentation of a dried film when formed from said lacquer;
   (d) an organic solvent for said film-forming agent; and,
   (e) plasticizer for said film-forming agent.

2. The improved lacquer of claim 1 wherein said soft matting agent particles have an average diameter not in excess of about 40 microns and wherein said hard particles are of about the same average diameter.

3. The improved lacquer of claim 2 wherein the ratio, by weight, of said film forming agent to said soft matting agent is about 1-3:3-1 and wherein said average soft matting agent particle diameter is about 10-40 microns.

4. The improved lacquer of claim 2 wherein said film-forming agent is present in a concentration sufficient to hold said matting agent particles securely in the resulting dried film but insufficient to cover said soft matting agent particles.

5. The improved lacquer of claim 1 wherein said hard matting agent is in a ratio, by weight, to said soft matting agent of about 1:10.

6. The improved lacquer of claim 5 wherein said hard matting agent comprises at least one of silica and calcium carbonate.

7. The improved lacquer of claim 5 wherein said solvent comprises at least one of isopropanol, propylene glycol monomethyl ether, methyl ethyl ketone, toluene and ethylalcohol and is present in an amount sufficient to dissolve or fluidize said film-former.

8. The improved lacquer of claim 5 wherein said plasticizer comprises at least one of sucrose acetate isobutyrate, dibutyl phthalate and tricresyl phosphate and is present in an amount sufficient to plasticize said film former.

9. The improved lacquer of claim 1 wherein said film former comprises at least one of styrene maleate resin, acrylic ester resin and ethyl cellulose.

* * * * *